E. J. BRYANT.
SINE BAR FIXTURE.
APPLICATION FILED NOV. 21, 1918.

1,303,633.

Patented May 13, 1919.
2 SHEETS—SHEET 1.

Inventor
Elmer J. Bryant
By George Ramsey
Attorney

E. J. BRYANT.
SINE BAR FIXTURE.
APPLICATION FILED NOV. 21, 1918.
1,303,633.
Patented May 13, 1919.
2 SHEETS—SHEET 2.
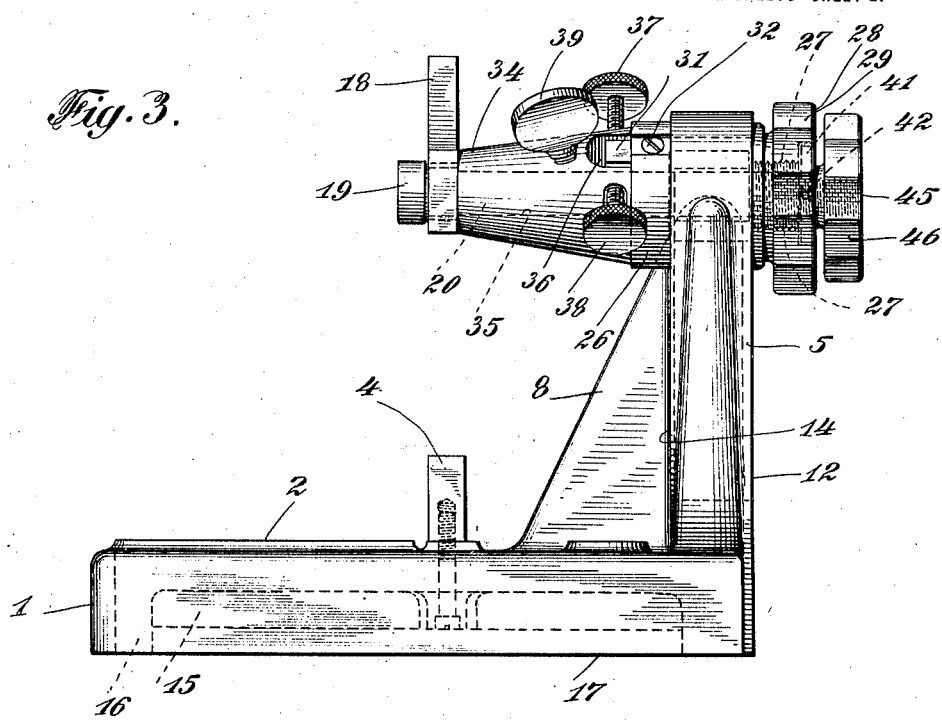
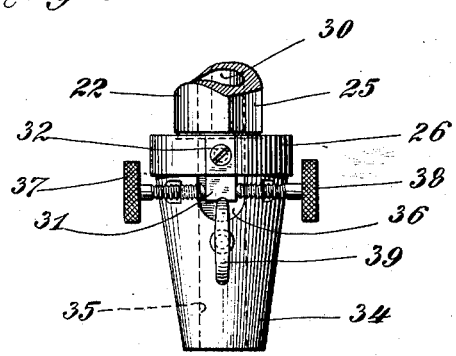
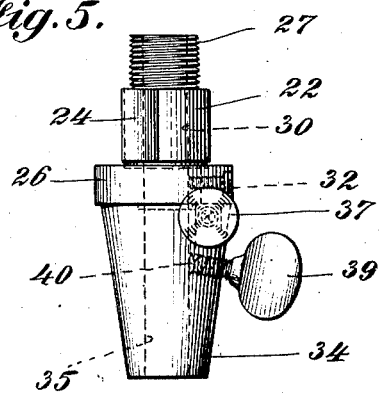
Inventor
Elmer J Bryant
By Attorney
George Ramsey

UNITED STATES PATENT OFFICE.

ELMER J. BRYANT, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

SINE-BAR FIXTURE.

1,303,633.   Specification of Letters Patent.   Patented May 13, 1919.

Application filed November 21, 1918. Serial No. 263,458.

*To all whom it may concern:*

Be it known that I, ELMER J. BRYANT, a citizen of the United States, residing at Woonsocket, in the county of Providence, State of Rhode Island, have invented certain new and useful Improvements in Sine-Bar Fixtures, of which the following is a specification.

My invention relates broadly to small tools and more particularly to improvement in sine bars for accurately determining the value of angles.

The principal object of the present invention is to provide a secure mounting for a sine bar in such manner that the bar may be accurately positioned to predetermined angular relation with the mount.

A further object of the present invention is a sine bar mounted in such manner that the bar may be swung around a pivotal point as a point of departure and the pivotal movement may be controlled by suitably mounted measuring screws.

Another object of the present invention is a sine bar mounted to be vertically adjustable relatively to a predetermined measuring surface in such manner that the pivot of the sine bar may be clamped in any predetermined position above the said surface and the sine bar rotated and clamped at any predetermined angle relatively to the said surface.

More specifically an object of the present invention is improvements on the sine bar described in the patent to Winter 1,169,900, patented Feb. 1, 1916.

This invention possesses many other advantageous features, some of which, together with the foregoing, will be set out more at length in the following description wherein will be outlined in full that form of the invention which I have selected for illustration in the drawings accompanying and forming a part of the present specification. In the drawings and specification I have described only the preferred form of my generic invention, but it is to be understood that I do not limit myself to such form because my invention may be embodied in a multiplicity of forms each being a species of my invention, it being understood that by the claims succeeding the description of my invention I desire to cover the invention in whatsoever form it may be embodied and practised.

Fig. 3 is an end elevation of the device shown in Fig. 2.

Fig. 4 is a detail plan view looking in the direction of the arrow A, Fig. 2.

Fig. 5 is a side view showing a detail comprising the assembly of the clamping collar and the adjustment sleeve.

Figure 1:
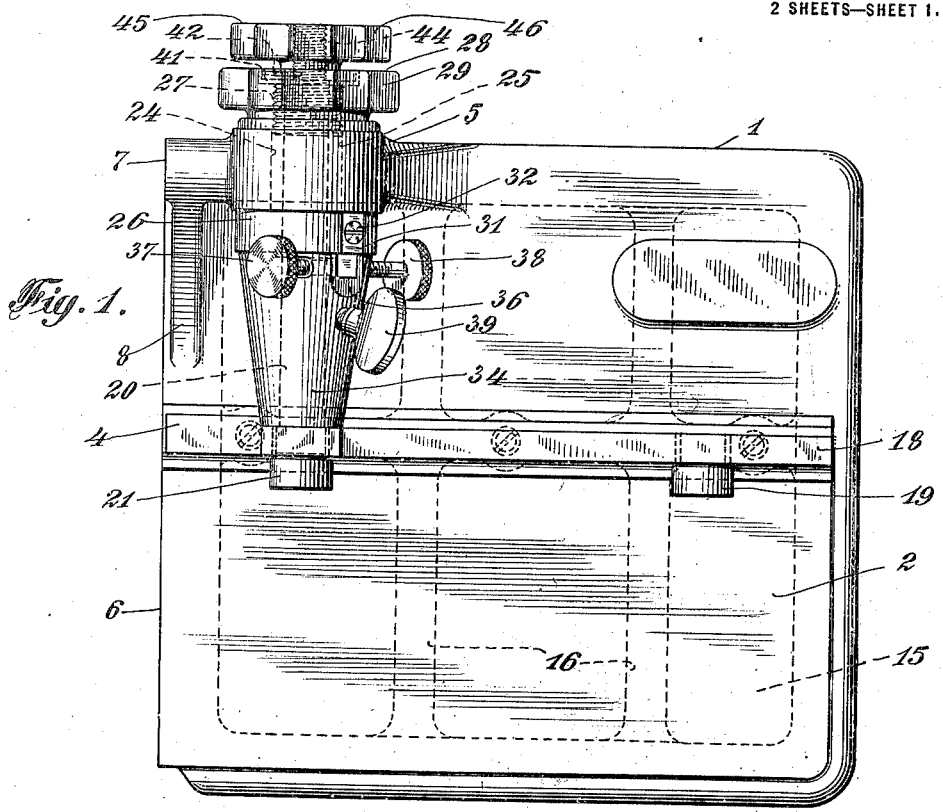
Figure 1 is a plan view of the preferred form of my invention.
Figure 2:
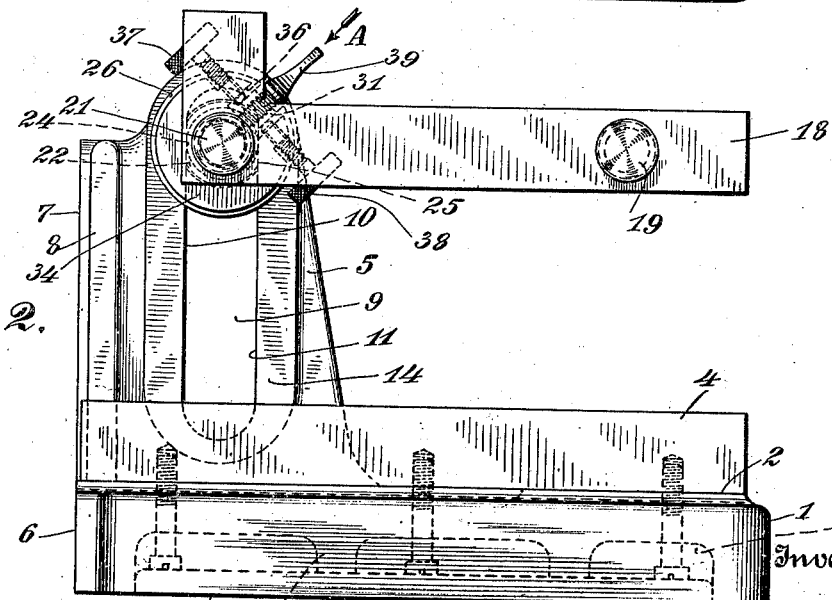
Fig. 2 is a front elevational view of the preferred form of my invention.

Heretofore in the art of sine bars it has been the custom to mount the sine bars above a suitable base the top of which comprises a surface plate and on which was mounted a surface plate bar. It was customary to utilize a single clamping bolt for retaining the sine bar both in its vertically adjusted position and in its angularly adjusted position. It is evident that in loosening the clamp bolt to change the angular relation it is possible and liable that the pivot of the sine bar would change in vertical relation at the same time. It is often desirable to maintain the vertical position constant and change the angular relation of the bar. It is equally desirable that the instrument be capable of maintaining the angular relation of the bar constant, when the vertical position of the bar is changed in order to effect certain measurements, or to bring the sine bar into contact with the surfaces presumably of the same inclination but of different heights.

Furthermore heretofore it has been the custom to mount the sine bar arm in such manner that it was moved by hand and held in position by friction. Considerable difficulty has been encountered in accurately setting such a friction-held sine bar by relying entirely upon direct hand movement of the bar for positioning of the bar. Furthermore, in view of the foregoing difficulties, the lack of ability to position the bar either vertically or angularly without disturbing the corresponding vertical and angular adjustment, and also the difficulty of setting the bar to correspond with a suitable height gage, are factors which slow up the use of such an instrument.

The present invention overcomes these difficulties of the prior art, and provides an instrument which may be more quickly and at the same time more securely adjusted and positioned to precise measurements than has heretofore been possible with the prior art sine bars. The present invention, being both quick to operate and very accurate, lends itself especially to the conditions in the modern shop which demand accuracy without loss of time. In accomplishing these results, the present invention comprises an improved sine bar wherein the vertical positioning means are independent of the angular positioning means for the bar and the angular positioning or turning devices for the bar are under control of opposed tangent screws for fine adjustment.

By this construction it will be obvious that the sine bar may be gently and minutely rotated in order that it may be brought into proper contact with an angularly disposed surface to be measured, or in order that the measuring button on the end of the sine bar may be properly positioned opposite the knife edge on the height gage, when the sine bar arm is being set to a predetermined angle.

Referring now to the drawings, the base member 1, on its upper portion, is provided with an accurately formed surface plate 2 on which is mounted a surface bar 4 that enables the instrument to measure angles on articles which could not be set on the surface plate 2, such as for example machine parts having accurately formed grooves, but an unfinished face, etc. A standard 5 is formed integral with the edge or side of the base member and is located adjacent one corner thereof in such manner that the edge 6 of the base and the side edge 7 of the standard 5 lie in a single plane so that they may form an accurate base, where it is desired to bring the instrument into coöperation with a separate surface plate as a supporting base from which measurements may be determined. In order to rigidly support the standard 5, a triangular web 8 is formed integral with the base and the standard, and is located at substantially right angles thereto. The standard 5 is provided with a vertical slot 9 the side edges 10 and 11 of which are accurately finished to lie in parallel planes. The sides of the standard are also finished as at 12 and 14 to likewise lie in parallel planes and form accurate seats for clamping means hereinafter described. In order to lighten the base, it is preferred that it be formed hollow as at 15 with suitable ribs 16 extending beneath the surface plate top and with each edge portion of the base carefully finished as at 17 in such manner that the bottom of the base lies in a plane parallel to the surface plate 2.

The sine bar 18 preferably is L-shaped with the long member of the bar provided with a cylindrical measuring button 19. The inner end of the measuring bar adjacent the juncture of the long and short arms is provided with a hardened bushing having an accurate opening through which extends the clamping bolt 20 which is provided with a measuring button head 21 that is very carefully finished to be exactly concentric with the opening in the sine bar and therefore concentric with the axis about which the sine bar rotates. The measuring buttons 19 and 21 are of exactly the same diameter and the axes of these buttons lie in a common plane and a predetermined distance apart, preferably ten or a factor of ten measuring units, for example five inches or ten inches, which greatly facilitates computations as will be hereinafter explained. The edges of the arms of the sine bar preferably are parallel, with the edges on the short arm arranged at right angles to the edges on the long arm. A clamping collar sleeve 22 is mounted for vertical movement in the vertical slot 9 with the sides of the sleeve flattened as at 24 and 25, with the distance between these flattened sides substantially the same or very slightly less than the distance between the edges 10 and 11 of the vertical slot 9, in order that the clamping collar sleeve 22 may accurately fit within the said slot. This member 22 is provided on one end with a clamping collar 26 and the other end of the member is screw-threaded as at 27 to carry the clamping nut 28 which is provided with suitable hand grips as at 29. The clamping collar sleeve 22 is provided with a bore 30 in which the bolt 20 is adapted to accurately fit. The clamping collar 26 is provided with an inset screw block 31 which is held in position by means of a machine screw 32. A taper sleeve 34 is adapted to set between the inner side of the sine bar 18 and the outer side or face of the clamping collar 26. This taper sleeve is provided with a bore 35 which is also adapted to accurately fit the clamp bolt 20. The taper sleeve 34 is provided with a recess 36 somewhat larger than the screw block 31 which recess is adapted to inclose the said screw block. The taper sleeve is screw threaded on each side of the recess and at substantially right angles thereto in such manner that the taper sleeve carries tangent screws 37 and 38 which are adapted to contact with the opposed sides of the block 31 so that an adjustment of the tangent screws will turn the taper sleeve 34 relatively to the clamping collar sleeve 22. The taper sleeve also carries a clamp thumb screw 39 which bears upon a small shoe 40 that is loosely mounted in a recess in the taper sleeve and is adapted to be set on the clamp bolt 20 by the thumb screw 39. When the parts are assembled the clamp bolt 20 is passed through the sine bar 18, then through the taper sleeve 34 in such manner that the shoe 40 rests upon the said bolt, and then finally through the clamping collar sleeve 22. After the parts are arranged as specified, the end of the clamp bolt 20 is fitted with a non-rotatable washer 41 that is provided with a small key-way which fits over a short pin 42 set on the end of the clamp bolt 20. The end of the clamp bolt is screw threaded as at 44 and carries a clamping nut 45 which is provided with suitable hand grips 46. The washer 41 being prevented from rotation by the short pin 42, provides a seat for the clamping nut 45 in such manner that the rotation of this clamping nut is not effective to tend to turn the clamping nut 28 so that after the nut 38 is seated the clamping nut 45 may be adjusted as often as desired without danger of loosening the permanent vertical adjustment.

From the foregoing construction it is obvious that by loosening the clamping nut 28 the sine bar pivot may be adjusted vertically in the slot 9 of the standard 5 and when the predetermined vertical position is reached tightening of the clamping nut 28 securely holds the pivot in this predetermined position. By slightly loosening the clamping nut 45 the sine bar 18 is released for rotary movement directly above the surface bar 4. When the sine bar has been rotated to approximately the required angular position, the thumb screw 39 is tightened to set the shoe 40 tightly against the clamp bolt 20. The final angular adjustment of the sine bar is now accomplished by adjusting the tangent screws 37 and 38 to rotate the arm of the sine bar around the axis of the measuring button 21. In making this adjustment it is preferable that the tangent screws be operated conversely, that is one screw being loosened while the other screw is being tightened. When the sine bar has been positioned as desired, the clamping nut 45 may be tightened and the sine bar will then be securely locked in the predetermined position. From the foregoing description it is evident that the translatory or vertical adjustments of the pivot are independent of the angular adjustments of the bar and that final angular adjustments are performed by precision screws so that the precise relation of the parts is quickly and easily accomplished.

Where the distance between the axes of the measuring buttons 19 and 21 is ten units, it is obvious that the vertical distance one button is above the other becomes a decimal of the natural sine of the angle, so that the measuring of this distance on a height gage is a direct reading on the gage of a decimal of the number comprising the said natural sine.

Having described my invention what I claim is:

1. A sine bar fixture comprising a supporting member, a measuring bar pivotally mounted upon said supporting member, a pair of cylindrical buttons coöperating with said measuring bar, one of said buttons having the same axis as the axis of rotation of said measuring bar, in combination with means to support said measuring bar in predetermined angular positions, said means comprising an abutment, and opposed tangent screws coöperating with said abutment.

2. A sine bar fixture comprising a supporting member, a measuring bar pivotally mounted upon a horizontal axis in such manner as to rotate in a vertical plane, said measuring bar being provided with a long arm and a short arm, the axes of said arms meeting the axis of rotation of said bar at a right angle, a pair of cylindrical buttons, one of which is carried by the measuring bar, in combination with means to support said measuring bar in predetermined angular positions, said means comprising a rotative sleeve to which the bar is secured, an abutment, and a tangent screw on said sleeve and coöperative with said abutment to rotate said sleeve relatively to said abutment.

3. A sine bar fixture comprising a supporting member, a measuring bar pivotally mounted upon said supporting member, a pair of cylindrical buttons coöperating with said measuring bar, certain of the edges of said measuring bar being parallel to the plane including the axes of said buttons, in combination with means to support said measuring bar in predetermined adjusted positions, said means comprising a tangent screw adapted to rotate said measuring bar upon its pivot when said tangent screw is rotated, and means opposed to said tangent screw to rigidly maintain the measuring bar in said adjusted positions.

4. A sine bar fixture comprising a supporting base having its under portion constructed in such manner as to comprise a surface for determining a predetermined plane comprising a base plane for measurements, a measuring arm mounted upon said supporting base in such manner as to rotate upon an axis parallel to the plane predetermined by said base, a pair of cylindrical buttons, one of which is mounted upon said measuring bar and the other of which is concentric with the axis about which said measuring arm may rotate, said cylindrical buttons being of exactly the same diameter and comprising means for determining a predetermined base line of measurements, in combination with a tangent screw adapted when operated to rotate said measuring arm through a relatively small angular movement, and means opposed to said tangent screw to rigidly maintain the measuring arm in predetermined positions.

5. A sine bar fixture comprising a base member and bracket supported by said base member, said bracket being provided with a vertical slot, a sine bar, a pivot bolt about which said bar is adapted to rotate, a clamp sleeve mounted within said vertical slot and being movable therein to position said pivot bolt at predetermined vertical heights above said base member, means for clamping said sine bar in predetermined angular positions, in combination with devices for adjusting the angular position of said sine bar.

6. A sine bar fixture comprising a base member provided on its upper portion with a surface plate, a bracket extending upwardly from said base member, said bracket being provided with a vertical slot, a clamp sleeve slidably mounted in said vertical slot, means to clamp said sleeve in predetermined adjusted positions within said slot, a pivot bolt carried by said sleeve, a second sleeve carried by said pivot bolt, a sine bar rotatably mounted upon said pivot bolt, and means coöperative with the said sleeves whereby said sine bar may be adjusted to predetermined angular positions.

7. A sine bar fixture comprising a base portion, a vertical bracket carried by said base portion, said vertical bracket being provided with vertically extending slot, a clamp sleeve adapted to be set in predetermined vertical positions in said slot, a sine bar, in combination with means for clamping and positioning said sine bar in predetermined angular positions independently of the adjustment of said clamp sleeve.

8. A sine bar fixture comprising a base, a supporting standard extending upwardly from said base, an adjustable member slidably mounted on said standard, means for clamping said adjustable member to said standard, a sine bar, devices for holding said sine bar in predetermined angular positions, said devices comprising an adjustment and tangent screws.

9. A sine bar fixture comprising a supporting member, a measuring bar pivotally mounted upon said supporting member, a pair of cylindrical buttons coöperating with said measuring bar, one of said buttons comprising the head of a clamp bolt and having the same axis as the axis of rotation of said measuring bar in combination with means to support said measuring bar in predetermined angular positions, said means comprising an abutment, a sleeve rotatably mounted on said clamp bolt, a pair of opposed tangent screws carried by said sleeve and coöperating with said abutment, and a clamp screw carried by said sleeve and adapted to clamp said sleeve to said clamp bolt.

10. A sine bar fixture comprising a supporting member, a measuring bar pivotally mounted upon the horizontal axis in such manner as to rotate in a vertical plane, said measuring bar being provided with a long arm and a short arm, the axes of said arms meeting the axis of rotation of said bar at a right angle, a cylindrical button carried by the long arm of said bar, a clamp bolt comprising the pivotal support for said measuring bar, the head of said clamp bolt comprising a button of the same diameter as the button mounted on said measuring bar, in combination with means to adjust said measuring bar to predetermined angular positions, said means comprising a rotating sleeve, a clamp screw carried by said sleeve and being adapted to clamp said sleeve to said bolt, an abutment, and a tangent screw coöperative with said abutment to rotate said sleeve and said bolt to adjust the angular position of said measuring bar.

11. A sine bar fixture comprising a supporting member, a measuring bar pivotally mounted upon said supporting member, a clamp bolt comprising the pivotal mount for said measuring bar, a cylindrical button carried by said measuring bar, a cylindrical button comprising the head of said bolt, certain of the edges of said measuring bar being parallel to the plane including the axes of said buttons, in combination with means to adjust said measuring bar in predetermined angular positions, said means comprising a sleeve slidably mounted on said bolt, an abutment, means adapted to connect said sleeve with said bolt whereby said sleeve and said bolt may be rotated together, and a tangent screw coöperating with said abutment and adapted when operated to rotate the said sleeve.

12. A sine bar fixture comprising a supporting base having its under portion formed to comprise a predetermined base plane, a measuring arm mounted upon said supporting base in such manner as to rotate upon an axis parallel to the said base plane, a cylindrical button carried by said measuring arm, a bolt forming the pivot for said arm and carrying a cylindrical button concentric with the axis around which said arm rotates and with the diameter of said button the same as the cylindrical button carried by the measuring arm, in combination with a sleeve upon said bolt, means for clamping said sleeve and said bolt to rotate together, and adjustment screws for rotating said sleeve and said bolt whereby said measuring arm may be rotated through predetermined angles.

13. A sine bar fixture comprising a base member, a bracket supported by said base member, said bracket being provided with a vertical slot, a sine bar, a pivot bolt for supporting said sine bar and around which said sine bar is adapted to rotate, a slidable sleeve mounted within said vertical slot and carrying said pivot bolt, means for clamping said slidable sleeve at predetermined vertical heights above said base member, in combination with a second sleeve mounted on said bolt, means to clamp said sleeve to said bolt, and devices for adjusting the rotative position of said second sleeve relatively to said slidable sleeve.

14. A sine bar fixture comprising a base member, a bracket extending upwardly from said base member, said bracket being provided with a vertical slot, a clamp sleeve slidably mounted in said vertical slot, means to clamp said sleeve in predetermined adjusted positions within said slot, in combination with a pivot bolt carried by said sleeve, a second sleeve mounted upon said pivot bolt, a sine bar rotatably mounted on said pivot bolt, a cylindrical head on said pivot bolt, a clamp nut for operating said pivot bolt to clamp said sine bar between said head and the end of said second sleeve, means for securing said second sleeve and said clamp bolt together, and adjustment screw devices for rotating said second sleeve whereby said measuring bar may be adjusted to predetermined angular positions.

ELMER J. BRYANT.